Aug. 3, 1937.  P. T. FARNSWORTH  2,089,054
INCANDESCENT LIGHT SOURCE
Filed March 9, 1936

INVENTOR,
PHILO T. FARNSWORTH.
BY Lippincott & Metcalf
ATTORNEYS.

Patented Aug. 3, 1937

2,089,054

UNITED STATES PATENT OFFICE 2,089,054

INCANDESCENT LIGHT SOURCE

Philo T. Farnsworth, San Francisco, Calif., assignor to Farnsworth Television Incorporated, San Francisco, Calif., a corporation of California Application March 9, 1936, Serial No. 67,889

7 Claims. (Cl. 250—27.5)

My invention relates to an incandescent light source, and particularly to an incandescent image source for use in a cathode ray tube for television or related purposes.

Among the objects of my invention are: To provide an incandescent screen clearly defining the trace of a cathode ray beam; to provide a screen which may be used to project an image defined by the trace of a cathode ray beam; to provide a screen which may be luminously excited to a higher degree of intensity than is possible with screens of the fluorescent type; to provide an incandescent screen sharply defining the trace of a cathode ray beam without appreciable luminosity of parts of the screen adjacent the path of the beam; to provide a stable and long-lived heat screen of minimum mass; to provide a heat screen mechanically strong enough to withstand the jars and shocks of ordinary usage; to provide an incandescible screen of open mesh construction; to provide a screen of open mesh construction such that elemental areas thereof may be raised to incandescence by electronic impact; to provide an incandescible screen which may be both an obstruction to, and permeable to, electrons; to provide an incandescible screen for cathode ray tubes in which heat losses are due almost entirely to radiation; to provide an incandescible screen, elemental areas of which may be raised to incandescence without injuring the structure thereof; to provide an incandescible screen, elemental areas of which may expand and contract greatly without injury to or gross distortion of, the screen; to provide a screen of refractory metal adapted to expand and contract greatly in its elemental areas under bombardment without injury to the screen; to provide a cathode ray tube wherein an image may be projected upon an incandescible screen with such brilliance that said image may be projected through an external optical system; and to provide a cathode ray tube suitable for television or any other purpose wherein a brilliant image is desired.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing.

Figure 2:
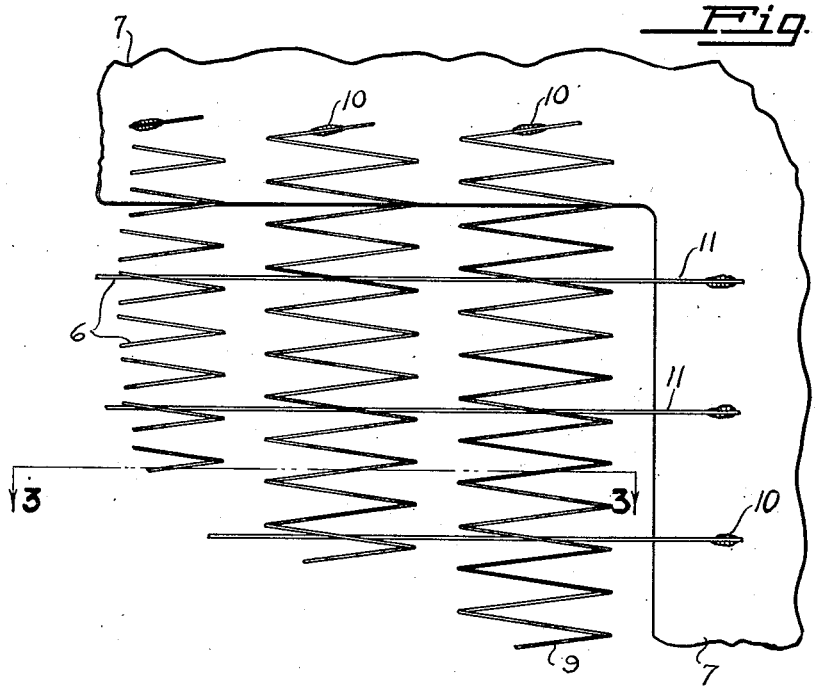
Figure 2 shows an enlarged view, not to scale, of a segment of the target screen shown schematically in Figure 1.
Figure 3:
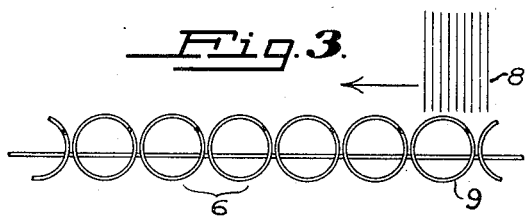

Figure 3 shows a view, partially in section, of the target screen, taken along plane 3—3 of Figure 2, showing the scanning beam 8 directed upon coils 9 of screen 6, scanning in the direction indicated.

In the earlier use of cathode ray tubes to produce a visible image, fluorescent material was used as a screen upon which a visible image could be produced under the action of the cathode ray beam.

For television purposes, it is desirable that this image be as bright as possible. Fluorescent materials have a practical upper limit of intensity less than that desired, since as the energy of the impinging beam is raised, a point is reached beyond which there is no increase in light emission, and the fluorescent materials themselves break down and lose their emitting power. To overcome this difficulty, it is desirable to use a screen of some refractory material which can be raised to incandescence by the action of the cathode ray beam.

In Farnsworth's application, Serial No. 655,784, filed February 8, 1933, entitled "Luminescent screen and method of use", there is disclosed and claimed a novel heat screen for a cathode ray tube wherein the screen material is either a fabric or an exceptionally thin refractory sheet positioned to be raised to incandescence by electron impact, and it is also pointed out therein that the main desideratum in such a heat screen is the prevention of conduction of heat in the screen, and that when heat losses can be limited as far as possible to radiation alone, the bombarded spot becomes more brilliant, and the heat thereof will be confined to the area actually impacted by the electron beam.

In the Farnsworth and Bamford application, Serial No. 20,158, filed May 7, 1935, entitled "Incandescent light source", and in the Farnsworth and Bamford application, Serial No. 20,159, filed May 7, 1935, entitled "Means and method for producing incandescent images", there are disclosed heat screens in which the losses are more closely limited to radiation than in the Farnsworth application, Serial No. 655,784 cited above, and new means were shown for solving the problem of elemental distortion of the screen under the expanding influence of heat. These inventions presented screens of very fine refractory wire, knitted or woven, and mounted in such a manner that there were no straight strands extending between opposite screen-supporting members. The screens were still further reduced in mass by etching in acid. Breakage in the body of the screen due to distortion was thus prevented, and increased brilliancy of the image, with a decreased power input from the cathode beam, was obtained by reducing the mass of the elements of the screen.

In the present invention, the problem of the distortion of the elemental members of the screen under the expanding influence of heat has been alternatively solved, and heat losses by other than radiation have been reduced. The latter result has been produced by greatly lengthening the path through which heat must travel by conduction to reach the adjoining planar areas of the structure. This has preferably been done by forming the screen of a great number of very small coils of very fine wire mounted with their longitudinal axes parallel, and preferably supported at intervals by transversely mounted wires.

The present invention comprises, broadly as to apparatus, a means for producing a beam of electrons, such as an electron gun, and a screen positioned to intercept the electrons in the beam, the screen comprising an open mesh structure inherently elastic, formed from relatively inelastic refractory materials, such as tungsten or tantalum, for example. I prefer to form the screen of adjacent coils of very fine wire, for example of diameter less than .001" and to produce an effective mesh count greater per unit area than the number of elements desired per unit area to form an image therein.

Figure 1:
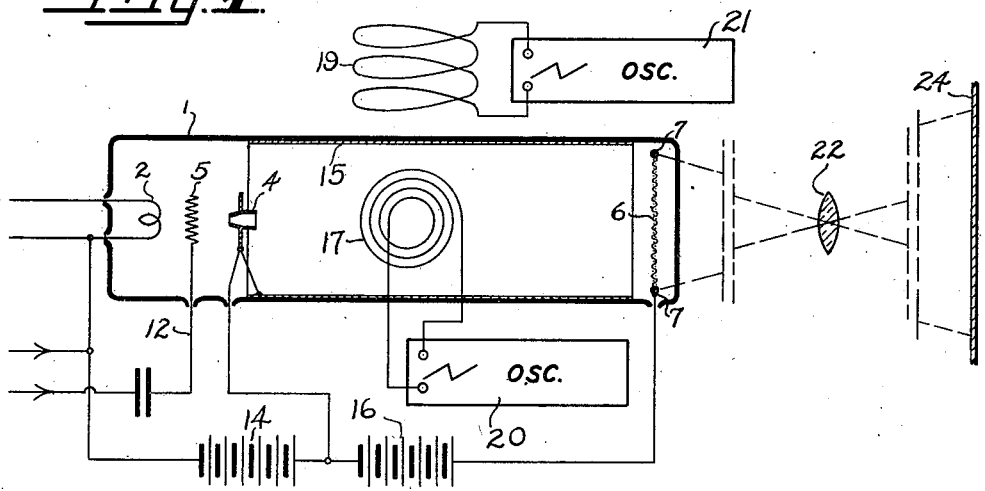
Figure 1 shows schematically a sectional view of my cathode ray tube connected for operation.

The more detailed operation and construction of my invention may be better understood by reference to the drawing, wherein Figure 1 shows schematically a preferred embodiment of my screen mounted in a cathode ray tube envelope 1, together with an electron gun and means for controlling the beam emitted from the gun.

At one end of envelope 1 is mounted a cathode, preferably a filament 2, and a gun type anode 4, between which is disposed a grid 5 adapted to control the flow of electrons. The gun 4 is purely conventional and any such anode-cathode combination is satisfactory; all other means known in the art to produce an electron beam are deemed full equivalents.

Anode 2 and cathode 4 cooperate when energized to produce a stream of electrons directed at high velocity toward the opposite end of the tube. The intensity of this stream is controllable by means of grid 5, as will be explained later. The electrons are accelerated toward the opposite end of the tube, in which is positioned the screen 6 of open mesh construction, supported upon a rectangular frame member 7.

The detailed mounting of a preferred screen 6 is shown in Figure 2. I prefer to make the screen of tungsten wire or similar material, utilizing therefor wire of less than .001" diameter, formed into coils 9, preferably by winding 1200 turns per inch upon a mandrel of less than .003" diameter. These coils are fixed upon frame 7 with their longitudinal axes parallel, by spot welds 10. At right angles to their axes are placed fine supporting wires 11, spotwelded to frame 7, so positioned as to maintain the elements of screen 6 in a substantially flat plane. It is apparent that elemental portions of coils 9 are free to expand or contract without breaking during bombardment by the beam of electrons.

The more complete operation of my invention may be understood by further reference to Figure 1, wherein the cathode ray tube 1 is shown connected in an electrical circuit such as a television receiver. Grid 5 has impressed upon it electrical impulses of varying intensity, such as those produced by scanning a picture to produce television signals, through input lead 12. The cathode filament 2 is externally energized to emit electrons. A positive potential is impressed upon anode 4, as by means of an external source 14, and also upon a beam focusing shield 15 positioned within tube 1 and extending from anode 4 to screen 6.

Magnetic focusing means, not shown in the drawing but fully described in my copending applications, Serial Nos. 20,158 and 20,159, cited above, may be utilized to concentrate the electron stream to a small point as a full equivalent of the static focusing means shown.

Screen 6 is maintained at a positive potential relative to the cathode 2 and anode 4 by means of an external source such as a battery 16. Electrons emitted from anode 4 are accelerated toward screen 6 by reason of this potential difference. The impact of the electron stream upon the turns of the screen coils causes them to be raised to incandescence, and become powerful light sources.

Scanning coils 17 and 19 are supplied with current from sawtooth oscillators 20 and 21; under their influence the electron beam is caused to pass over successive elementary areas of screen 6, heating them to incandescence. The brilliance of each element will correspond to the strength of the impinging beam, which is controlled by the potential of grid 5 in accord with the signal voltage impressed upon it through lead 12.

By these means, when properly synchronized with the transmitting apparatus, in accord with principles well known in the art, an incandescent image is produced on screen 6 which is a reproduction of the subject scanned by the transmitter.

The raising of the screen elements from room temperature to incandescence requires considerable power in the cathode ray beam. It is sometimes convenient to raise the temperature of the entire screen to a barely visible red glow with a polarizing heat supplied by an external source.

For this purpose I may prefer to irradiate the screen with infra-red rays, or to direct an unfocused unmodulated stream of cathode rays upon it. Alternative means which I have found satisfactory include passing steady direct current or low-frequency alternating current through the screen. The entire energy of the impinging beam is then available for varying the brilliance of the screen elements within the visible range. This procedure was fully explained in my copending application, Serial No. 655,784 cited above.

I prefer to move the scanning beam across screen 6 perpendicular to the longitudinal axis of the coils and perpendicular to the flat plane of the screen as shown in Figure 3.

It should be pointed out, however, that the mesh can be mounted upon its frame on the bias without reducing the screen's efficiency, and I do not care to be limited to any particular scanning pattern.

The incandescent image may be projected through an external optical system, schematically shown at 22, and viewed upon a screen 24 or by any other convenient means.

I prefer to use a number of turns per coil far greater than the number of lines to be scanned, so that several turns of the coil will be impacted and raised to incandescence at the same time, and the number of coils provided is greater than the number of elements in the image desired in order that the detail may be clearly shown. The mass of the screen must be as small as possible in order that maximum brilliancy may be obtained, and for this purpose I may find it practical to clean my screen and etch it in a solution of hot sodium nitrite. By this means the diameter of the individual wires may be reduced to .00025" after fabrication. It then becomes highly efficient, conduction losses are reduced to a minimum, and the heat loss is hence almost entirely due to radiation. Accordingly, when bombarded, my screen becomes intensely incandescent, producing an image with high fidelity to detail and of such intensity as to be suitable for projection upon a screen for viewing.

I claim:

1. A cathode ray tube containing an incandescible screen characterized by having the elemental structure thereof composed of a helix of fine refractory wire.

2. A cathode ray tube having an incandescible screen therein composed of a plurality of closely mounted helices of very fine tungsten wire.

3. In combination with an envelope containing a cathode and an anode cooperating to produce an electron beam, a target positioned in the path of said beam comprising a plurality of adjacent helical coils of refractory wire whose longitudinal axes are fixed parallel to each other in a plane.

4. In combination with an envelope containing a cathode and anode cooperating to produce an electron beam, a target positioned in the path of said beam comprising a plurality of helical cylindrical coils of refractory wire, said coils being parallelly mounted in a plane and having substantially 250 coils per inch.

5. In combination with an envelope containing a cathode and an anode cooperating to produce an electron beam, a target positioned in the path of said beam comprising a plurality of helical cylindrical coils of refractory wire of substantially 1200 turns per inch, said coils being parallelly mounted in a plane at a separation equivalent to 250 coils per inch.

6. In combination with an envelope containing an anode and a cathode cooperating to produce a beam of electrons, a target positioned to intercept said beam, said target comprising a plurality of adjacent helical axially parallel coils of fine refractory wire, said coils having substantially 1200 turns per inch and being spaced 250 to the inch.

7. In combination with a television receiver, an envelope containing an anode and a cathode cooperating to produce a beam of electrons, means for modulating said beam with television signals, a target positioned to intercept said beam, said target comprising a plurality of adjacent, axially planar and parallel, helical coils of tungsten wire of a diameter substantially .00025", and having a number of coils substantially greater than the number of elements in the image desired.

PHILO T. FARNSWORTH.